(12) United States Patent
Volz et al.

(10) Patent No.: US 8,733,729 B2
(45) Date of Patent: May 27, 2014

(54) BACK PRESSURE CAPABLE SOLENOID OPERATED DIAPHRAGM PILOT VALVE

(75) Inventors: Gregory Volz, Pequannock, NJ (US);
Paul W. Freisinger, Stockholm, NJ (US); Juan Antonio Cervantes, Mexicali (MX); Gabriel Arias, Mexicali (MX)

(73) Assignee: Liebert Corporation, Columbus, OH (US)

( * ) Notice: Subject to any disclaimer, the term of this patent is extended or adjusted under 35 U.S.C. 154(b) by 0 days.

(21) Appl. No.: 13/269,912

(22) Filed: Oct. 10, 2011

(65) Prior Publication Data

US 2013/0087727 A1    Apr. 11, 2013

(51) Int. Cl.
*F16K 31/12* (2006.01)

(52) U.S. Cl.
USPC ............................... 251/30.04; 251/26

(58) Field of Classification Search
USPC ........... 251/30.01–30.05, 26; 137/487.5, 490, 137/491, 492
See application file for complete search history.

(56) References Cited

U.S. PATENT DOCUMENTS

| | | | | |
|---|---|---|---|---|
| 3,862,738 | A | * | 1/1975 | Stumpmeier .................... 251/43 |
| 4,779,836 | A | * | 10/1988 | Marklund ........................ 251/26 |
| 4,981,280 | A | | 1/1991 | Brandenberg |
| 5,213,303 | A | | 5/1993 | Walker |
| 5,551,664 | A | * | 9/1996 | Boke ........................... 251/30.03 |
| 5,645,264 | A | | 7/1997 | Kah, Jr. |
| 6,092,784 | A | | 7/2000 | Kalfsbeck |
| 6,276,663 | B1 | | 8/2001 | Anderson et al. |
| 6,328,275 | B1 | * | 12/2001 | Yang et al. .................. 251/30.03 |
| 6,343,621 | B1 | | 2/2002 | Holmes et al. |
| 6,457,487 | B1 | * | 10/2002 | Stephenson et al. ..... 137/596.16 |
| 7,000,889 | B2 | | 2/2006 | Kah, Jr. et al. |
| 7,232,106 | B2 | | 6/2007 | Kah, Jr. et al. |

(Continued)

FOREIGN PATENT DOCUMENTS

| | | |
|---|---|---|
| DE | 1775178 | 7/1971 |
| EP | 624835 B1 | 11/1994 |

(Continued)

OTHER PUBLICATIONS

Hatzenbichler, C., International Search Report for International Patent Application No. PCT/US2012/059325, dated Dec. 4, 2012, European Patent Office.

(Continued)

*Primary Examiner* — John K Fristoe, Jr.
*Assistant Examiner* — Andrew J Rost
(74) *Attorney, Agent, or Firm* — Locke Lord LLP (57) ABSTRACT

A valve assembly comprising an inlet port, an outlet port, and a diaphragm configured to selectively allow communication between the inlet port and the outlet port, the diaphragm including a first side adjacent the ports and a second side opposed to the ports. The valve preferably includes at least one bleed path between the first side and the second side of the diaphragm with a one way flow device configured to allow flow from the first side to the second side of the diaphragm and prevent flow from the second side to the first side of the diaphragm. The valve may include a first bleed path from the inlet port to the second side of the diaphragm and a second bleed path from the outlet port to the second side of the diaphragm. Either bleed path, or both, may comprise a check valve mounted in the diaphragm.

15 Claims, 8 Drawing Sheets

(56) References Cited

U.S. PATENT DOCUMENTS

| | | |
|---|---|---|
| 7,621,211 B2 * | 11/2009 | Ma et al. .......................... 91/446 |
| 7,810,518 B2 | 10/2010 | Cosgrove et al. |
| 2005/0184261 A1 | 8/2005 | Stern |
| 2007/0290152 A1 * | 12/2007 | Ma et al. .................... 251/30.01 |
| 2008/0289693 A1 | 11/2008 | Irwin et al. |
| 2009/0032746 A1 * | 2/2009 | Smith et al. ................ 251/30.02 |
| 2009/0212244 A1 | 8/2009 | Pfaff et al. |
| 2010/0089471 A1 | 4/2010 | Zakay et al. |
| 2010/0155633 A1 * | 6/2010 | Pfaff .......................... 251/30.02 |
| 2010/0155638 A1 | 6/2010 | Zurke |
| 2010/0294380 A1 * | 11/2010 | Nagata et al. .............. 137/487.5 |
| 2011/0108137 A1 | 5/2011 | Grenaway et al. |
| 2011/0297252 A1 | 12/2011 | Hurley et al. |

FOREIGN PATENT DOCUMENTS

| | | |
|---|---|---|
| WO | 2007149197 | 12/2007 |
| WO | 2007149229 | 12/2007 |
| WO | 2008152427 A2 | 12/2008 |

OTHER PUBLICATIONS

Hatzenbichler, C., Written Opinion for International Patent Application No. PCT/US2012/059325, dated Dec. 4, 2012, European Patent Office.

* cited by examiner

BACK PRESSURE CAPABLE SOLENOID OPERATED DIAPHRAGM PILOT VALVE

CROSS REFERENCE TO RELATED APPLICATIONS

None.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to solenoid valves; and more specifically relate to solenoid operated piloted valves.

2. Description of the Related Art

Figure 1:
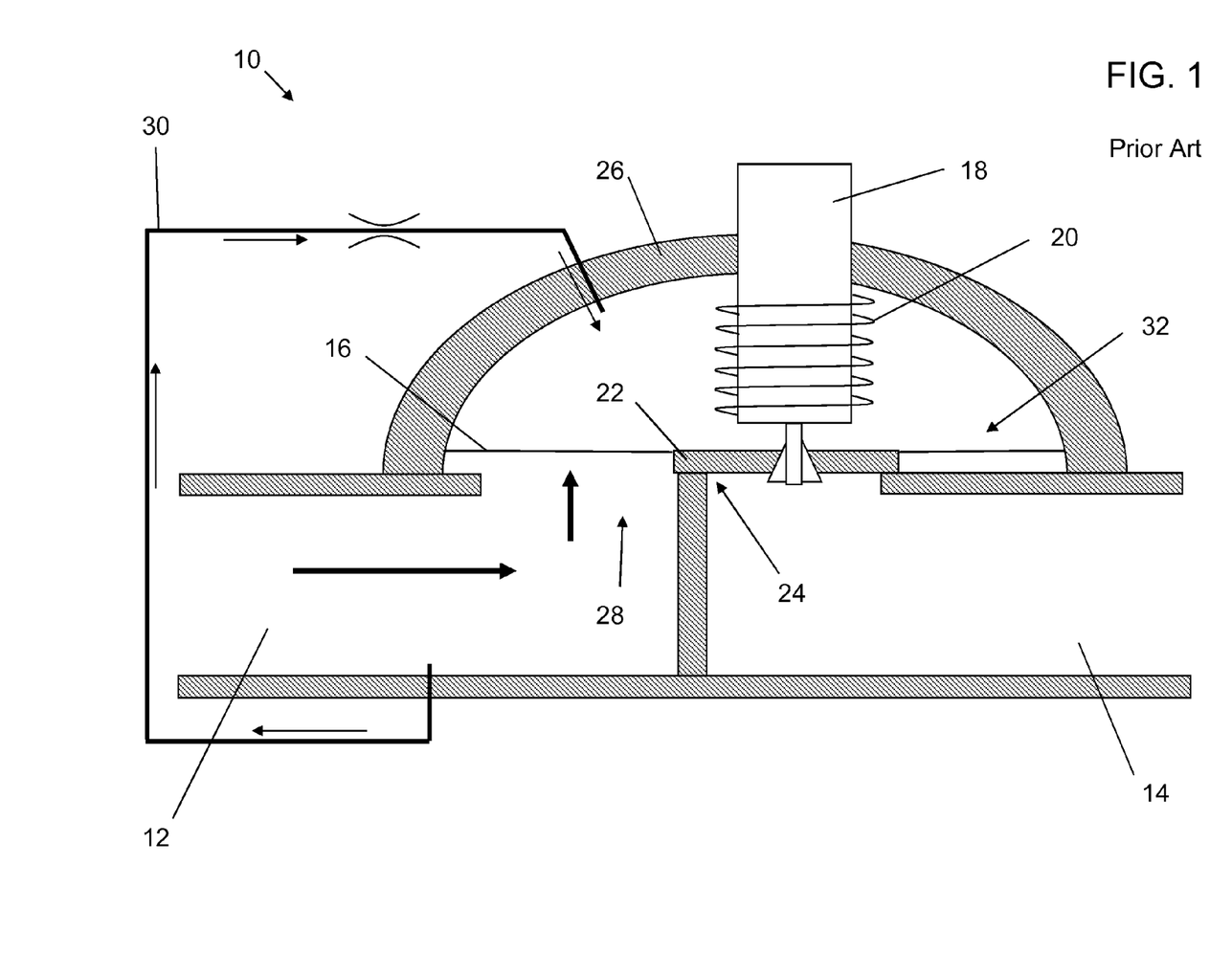
FIG. 1 illustrates a prior art embodiment of a solenoid operated piloted diaphragm valve, in a closed position.

FIG. 1 shows a typical solenoid operated piloted diaphragm valve 10, shown in a closed position. In the closed position, process, or process control, fluid, or gas, enters an inlet port 12, but is prevented from exiting an outlet port 14. The fluid pushes against a diaphragm 16, which is held down in part by a solenoid operated plunger 18 and a closing spring 20. More specifically, the plunger 18 pushes a valve seal 22 of the diaphragm 16 against a valve seat 24, thereby isolating the inlet port 12 off from the outlet port. These parts are normally at least partially enclosed by a body 26.

An inlet pressure, of the process fluid, pushes against a first side 28 the diaphragm 16. If the force exerted by the inlet pressure is great enough to overcome the solenoid operated plunger 18 and/or closing spring 20, that inlet pressure could force the valve 10 to open without further provisions. This is often prevented by providing a bleed path 30 from the inlet port 12 to a second side 32 of the diaphragm 16, the second side 32 opposing the ports 12,14. Using the bleed path 30, more surface area of the second side 32 of the diaphragm 16 is exposed to the inlet pressure compared to the surface area that is exposed on the first side 28 of the diaphragm 16 at the inlet port 12. This difference in exposed surface area ensures that greater actual force is exerted against the second side 32 of the diaphragm 16 than is asserted against the first side 28 of the diaphragm 16, thereby holding the valve 10 closed.

Figure 2:
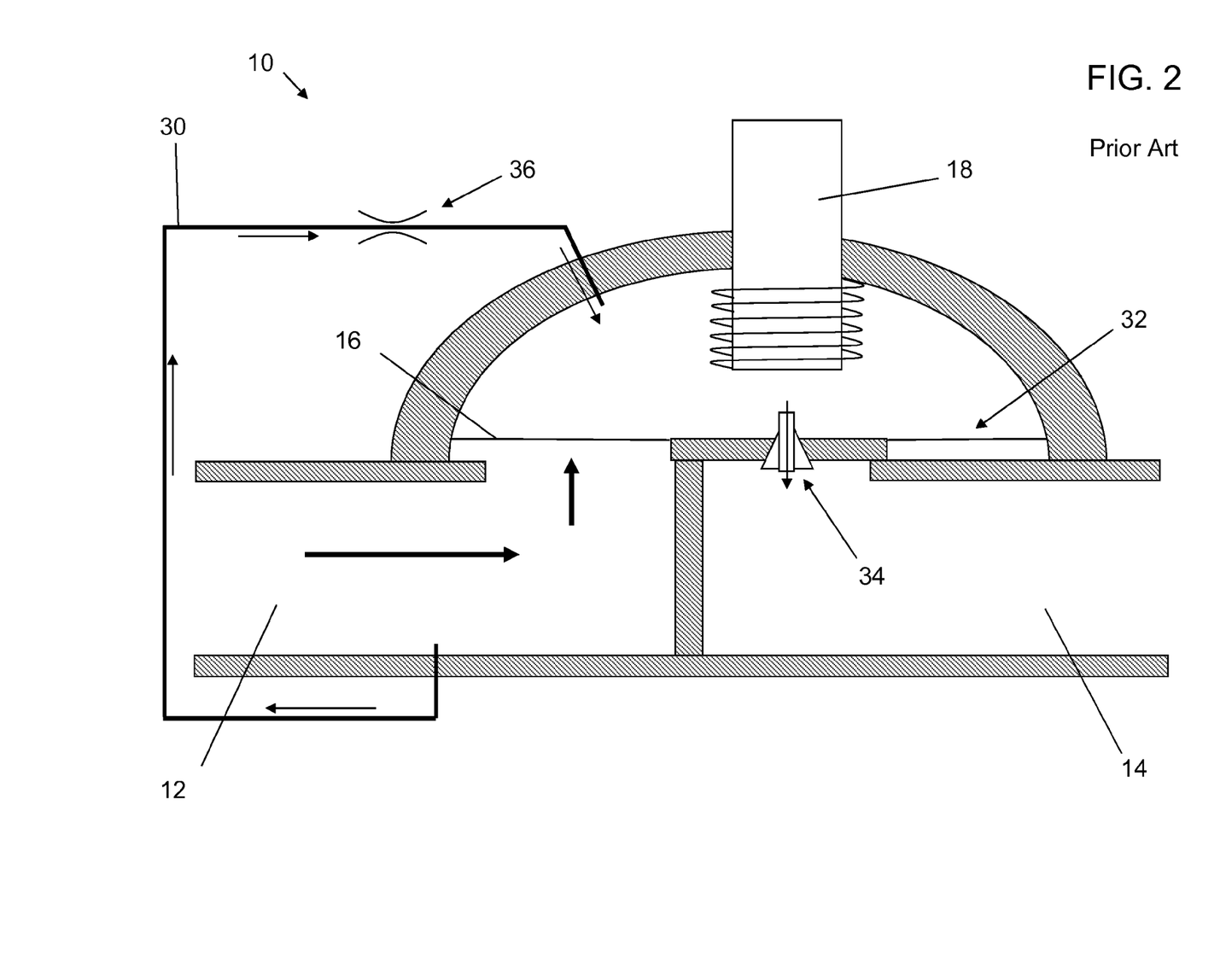
FIG. 2 illustrates the valve of FIG. 1, in a transitioning position.

Referring also to FIG. 2, when opening the valve 10 is desired, the solenoid operated plunger 18 is shifted away from the diaphragm 16, thereby exposing a pilot port 34 through the diaphragm 16. This allows the process fluid to escape from the second side 32 of the diaphragm 16 to the outlet port 14. To prevent the bleed path 30 from replenishing the process fluid as it escapes from the second side 32 of the diaphragm 16 to the outlet port 14 through the pilot port 34, the bleed path 30 often includes a restriction 36, and/or is otherwise sized to be more restrictive than the pilot port 34.

Figure 3:
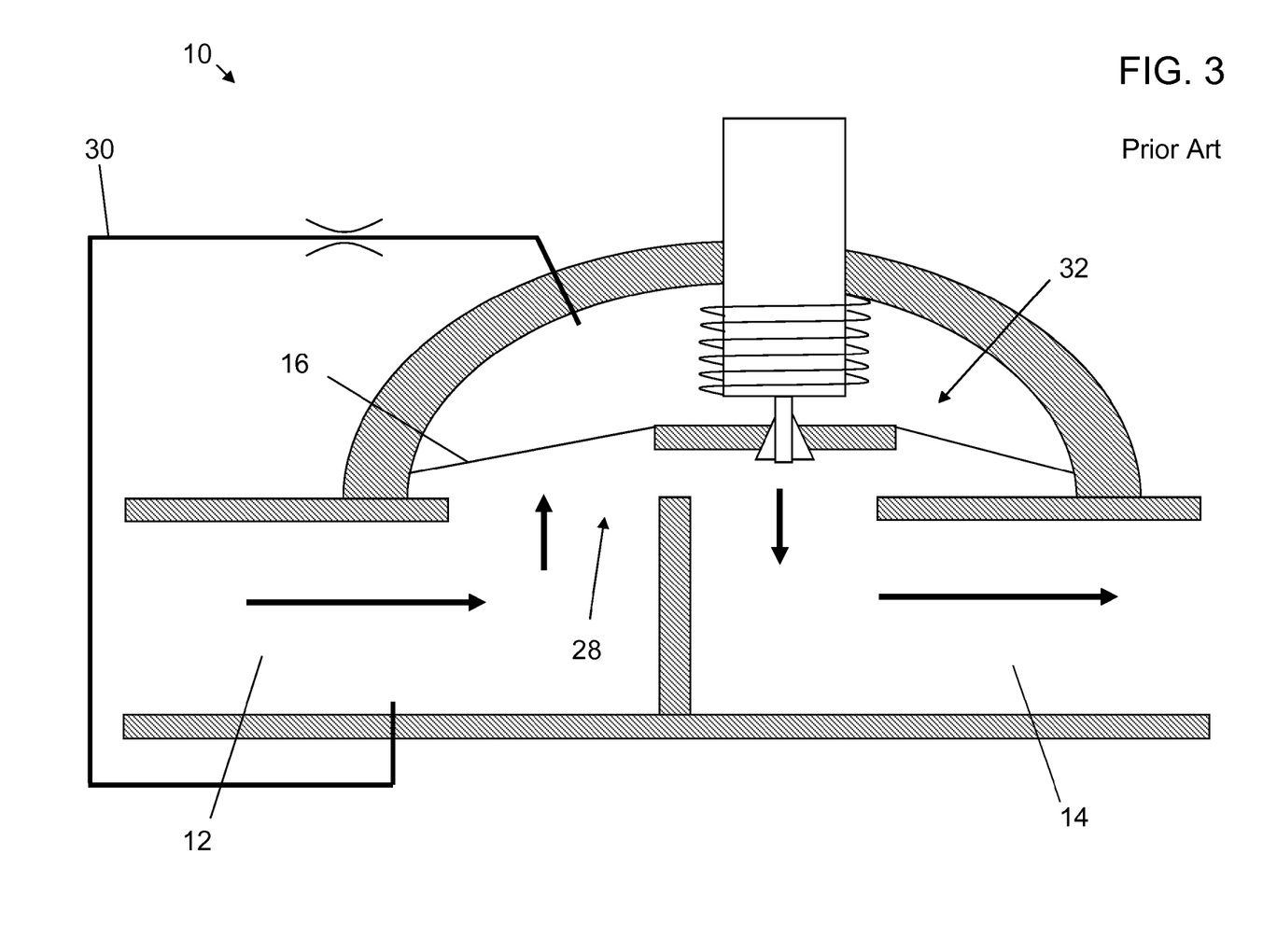
FIG. 3 illustrates the valve of FIG. 1, in an open position.

Therefore, as the process fluid escapes from the second side 32 of the diaphragm 16 to the outlet port 14, the bleed path 30 cannot replenish the process fluid fast enough, and thus the force it exerts on the second side 32 of the diaphragm 16 lessens. Referring also to FIG. 3, once the force on the second side 32 of the diaphragm 16 reaches, or becomes less than, the force the inlet pressure exerts on the first side 28 of the diaphragm 16 at the inlet port 12, the valve 10 opens and fully communicates the inlet port to the outlet port 14.

The inventions disclosed and taught herein are directed to an improved solenoid operated piloted diaphragm valve.

BRIEF SUMMARY OF THE INVENTION

A valve assembly comprising an inlet port, an outlet port, and an isolation member configured to selectively allow communication between the inlet port and the outlet port, the isolation member including a first side adjacent to the ports and a second side opposed to the ports. The valve preferably includes at least one bleed path between the first side and the second side of the isolation member and a one way flow device in the bleed path configured to allow flow from the first side to the second side of the isolation member and prevent flow from the second side to the first side of the isolation member. The valve may include a first bleed path from the inlet port to the second side of the isolation member and a second bleed path from the outlet port to the second side of the isolation member. The first bleed path may include a first one way flow device configured to allow flow from the inlet port to the second side of the isolation member and prevent flow from the second side of the isolation member to the inlet port. The second bleed path may include a second one way flow device configured to allow flow from the outlet port to the second side of the isolation member and prevent flow from the second side of the isolation member to the outlet port. Either bleed path, or both, may comprise a check valve mounted in the isolation member and/or a seal.

DETAILED DESCRIPTION OF THE INVENTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created a valve assembly comprising an inlet port, an outlet port, and an isolation member configured to selectively allow communication between the inlet port and the outlet port, the isolation member including a first side adjacent to the ports and a second side opposed to the ports. The valve preferably includes at least one bleed path between the first side and the second side of the isolation member and a one way flow device in the bleed path configured to allow flow from the first side to the second side of the isolation member and prevent flow from the second side to the first side of the isolation member. The valve may include a first bleed path from the inlet port to the second side of the isolation member and a second bleed path from the outlet port to the second side of the isolation member. The first bleed path may include a first one way flow device configured to allow flow from the inlet port to the second side of the isolation member and prevent flow from the second side of the isolation member to the inlet port. The second bleed path may include a second one way flow device configured to allow flow from the outlet port to the second side of the isolation member and prevent flow from the second side of the isolation member to the outlet port. Either bleed path, or both, may comprise a check valve mounted in the isolation member and/or a seal.

FIG. 1 shows a typical solenoid operated piloted diaphragm valve 10, shown in a closed position. In the closed position, process, or process control, fluid, or gas, enters an inlet port 12, but is prevented from exiting an outlet port 14. The fluid pushes against a diaphragm 16, which is held down in part by a solenoid operated plunger 18, with is in turn held down by a closing spring 20. More specifically, the plunger 18 pushes a valve seal 22 of the diaphragm 16 against a valve seat 24, thereby closing the inlet port 12 off from the outlet port. These parts are normally at least partially enclosed by a body 26.

An inlet pressure, of the process fluid, pushes against a first side 28 the diaphragm 16. If a force exerted by the inlet pressure is great enough to overcome the solenoid operated plunger 18 and/or closing spring 20, that inlet pressure could force the valve 10 open, without further provisions. This is often prevented by providing an inlet bleed path 30 from the inlet port 12 to a second side 32 of the diaphragm 16, the second side 32 opposing the ports 12,14. Using the inlet bleed path 30, more surface area of the second side 32 of the diaphragm 16 is exposed to the inlet pressure compared to the surface area that is exposed on the first side 28 of the diaphragm 16 at the inlet port 12. This difference in exposed surface area ensures that greater actual force is exerted against the second side 32 of the diaphragm 16 than is asserted against the first side 28 of the diaphragm 16, thereby holding the valve 10 closed.

Referring also to FIG. 2, when opening the valve 10 is desired, the solenoid operated plunger 18 is shifted away from the diaphragm 16, thereby exposing a pilot port 34 through the diaphragm 16. This allows the process fluid to escape from the second side 32 of the diaphragm 16 to the outlet port 14. To prevent the bleed path 30 from replenishing the process fluid as it escape from the second side 32 of the diaphragm 16 to the outlet port 14 through the pilot port 34, the inlet bleed path 30 often includes a restriction 36, or is otherwise sized to be more restrictive than the pilot port 34.

Therefore, as the process fluid escapes from the second side 32 of the diaphragm 16 to the outlet port 14, the inlet bleed path 30 cannot replenish the process fluid fast enough, and thus the force it exerts on the second side 32 of the diaphragm 16 lessens. Referring also to FIG. 3, once the force on the second side 32 of the diaphragm 16 reaches, or becomes less than, the force the inlet pressure exerts on the first side 28 of the diaphragm 16 at the inlet port 12, the valve 10 opens and fully communicates the inlet port to the outlet port 14.

Figure 4:
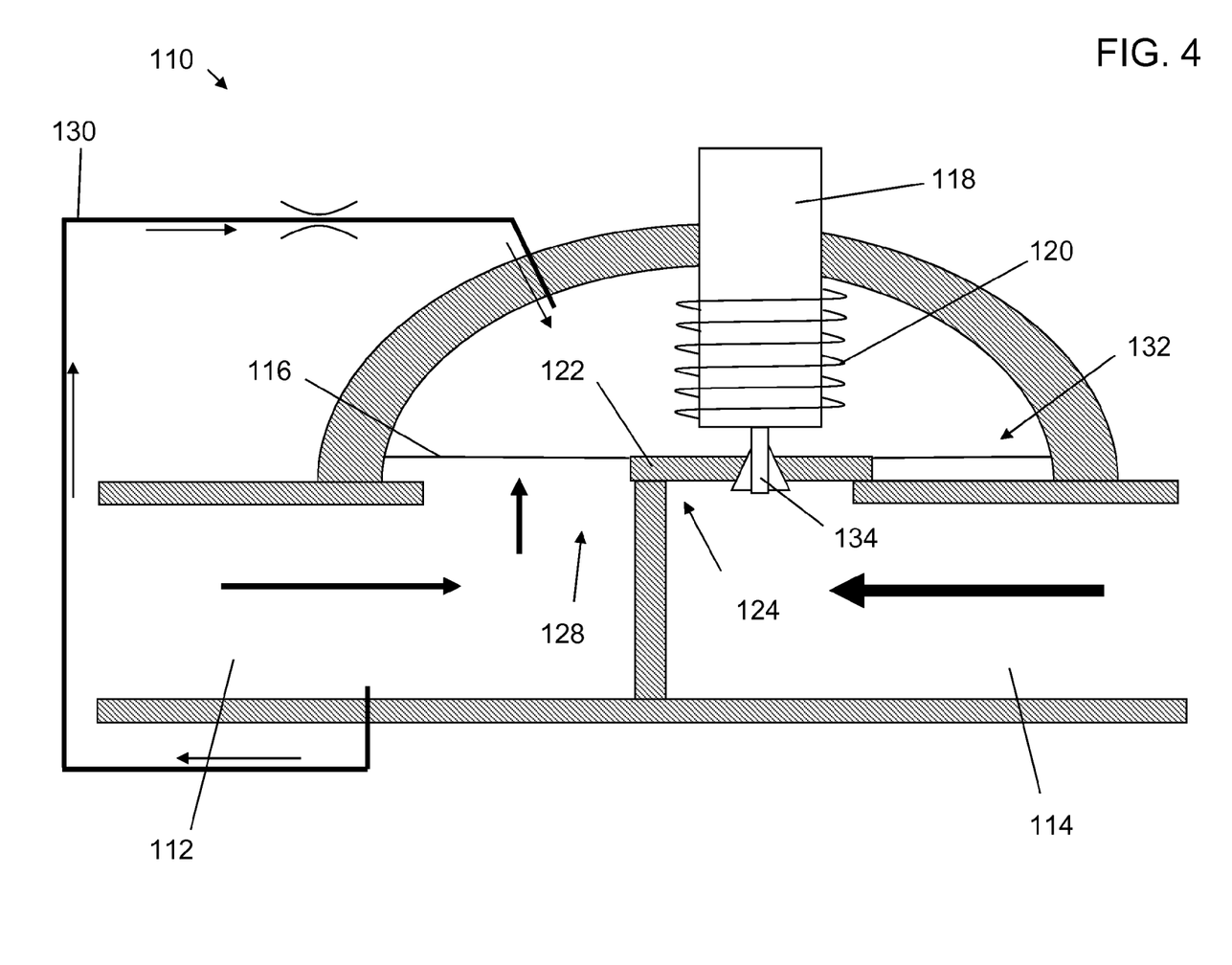
FIG. 4 illustrates a solenoid operated piloted diaphragm valve experiencing back pressure.

Referring also to FIG. 4, a solenoid operated piloted diaphragm valve 110, may be exposed to backpressure at an outlet port 114. If the backpressure, or outlet pressure, is higher than an inlet pressure at an inlet port 112, that backpressure may be able to force open the valve 110 and force communication between the inlet port 112 and the outlet port 114. More specifically, if the backpressure at the outlet port 114 is higher than the inlet pressure at the inlet port 112, the backpressure may push against a seal between a solenoid operated plunger 118 and a pilot port 134 in a diaphragm 116, thereby overcoming a closing spring 120, lifting the plunger 118 off of the pilot port 134, and allowing communication between a first side 128 the diaphragm 116, at the outlet port 114, and a second side 132 of the diaphragm 116, opposing the ports 112, 114, and even the inlet port 112 through the bleed path 130. Additionally, or alternatively, if the backpressure at the outlet port 114 is greater than the inlet pressure at the inlet port 112, the backpressure may push against a valve seal 122 of the diaphragm 116 lifting it off a valve seat 124, thereby permitting direct communication between the outlet port 114 and the inlet port 112.

One method for controlling the backpressure is to use a larger closing spring 120 and/or a stronger solenoid to operate the plunger 118. Either option may require an increase in power requirements for the solenoid operated plunger 118.

Figure 5:
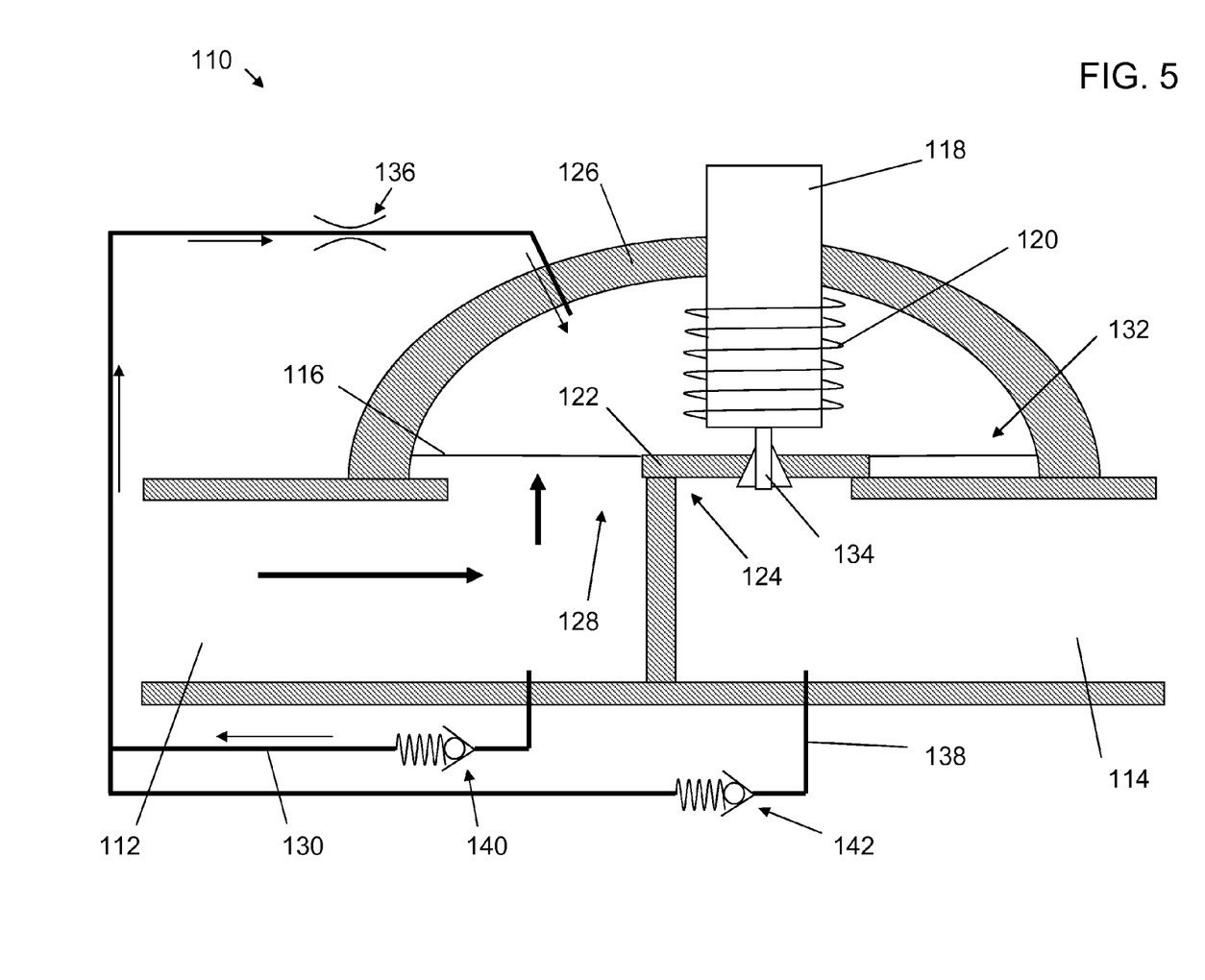
FIG. 5 illustrates a particular embodiment of a solenoid operated piloted diaphragm valve utilizing certain aspects of the present inventions.

Alternatively, referring also to FIG. 5, the solenoid operated piloted diaphragm valve 110 also may include an outlet bleed path 138 from the outlet port 114 to the second side 132 of the diaphragm 116. The outlet bleed path 138 preferably does not interfere with the function of the inlet bleed path 130, should one exist in any specific embodiment. Thus, the inlet bleed path 130 is still able to ensure that more surface area, of the second side 132, of the diaphragm 116 is exposed to the inlet pressure, than is exposed to the first side 128 of the diaphragm 116 at the inlet port 112. This difference in exposed surface area ensures that greater actual force is exerted against the second side 132 of the diaphragm 116 than is asserted against the first side 128 of the diaphragm 116, thereby holding the valve 110 closed. These parts may be at least partially enclosed by a body 126.

To prevent the outlet bleed path 138 and the inlet bleed path 130 from interfering with the function of each other, and/or prevent cross contamination between the inlet port 112 and the outlet port 114, the inlet bleed path 130 may include an inlet check valve, or other one way flow device, 140 that allows flow from the first side 128, at the inlet port 112, to the second side 132 of the diaphragm 116 and prevents flow from the second side 132 to the first side 128 of the diaphragm 116. Alternatively, and/or additionally, the outlet bleed path 138 may include an outlet check valve, or other one way flow device, 142 that allows flow from the first side 128, at the outlet port 114, to the second side 132 of the diaphragm 116 and prevents flow from the second side 132 to the first side 128 of the diaphragm 116, at the outlet port 114.

Figure 6:
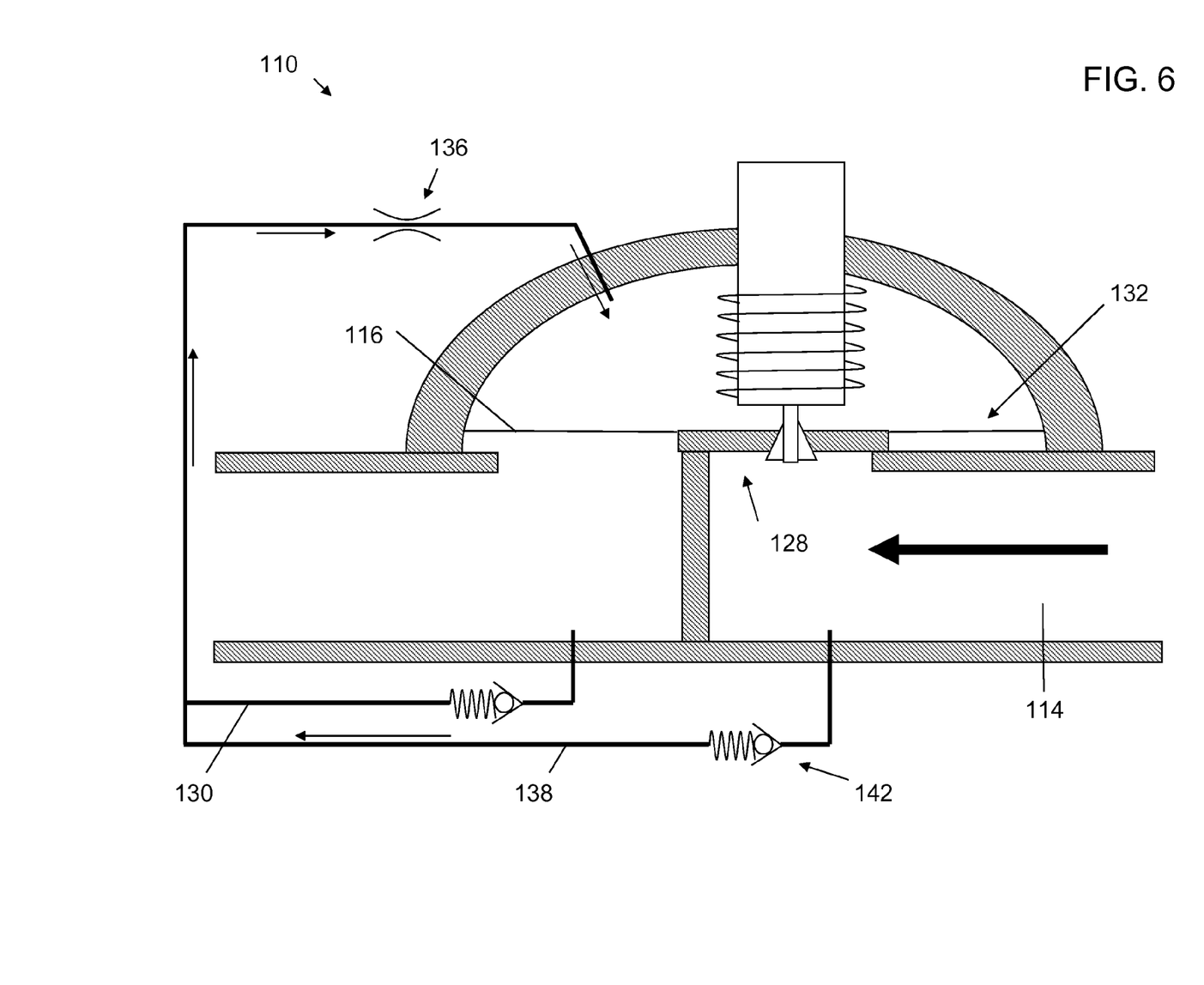
FIG. 6 illustrates the valve of FIG. 5 experiencing back pressure.

Referring also to the FIG. 6, using the outlet bleed path 138, more surface area, of the second side 132, of the diaphragm 116 is exposed to the backpressure, than is exposed to the first side 128 of the diaphragm 116 at the outlet port 114. This difference in exposed surface area ensures that greater actual force is exerted against the second side 132 of the diaphragm 116 than is asserted against the first side 128 of the diaphragm 116, thereby holding the valve 10 closed. Thus, the outlet bleed path 138 may function similarly to the inlet bleed path 130, and may even include a restriction 136, or otherwise be sized to be more restrictive than the pilot port 134.

In this manner, the solenoid operated piloted diaphragm valve 110 of the present invention can handle inlet pressure, at the inlet port 112, and/or backpressure, at the outlet port 114, equally well. This allows the valve 110 of the present invention to function properly when installed incorrectly and/or in applications where the valve 110 may be exposed to pressure at the inlet port 112, and/or at the outlet port 114.

As shown in FIGS. 5 and 6, portions of the inlet bleed path 130 and the outlet bleed path 138 may be common. Alternatively, the inlet bleed path 130 may be completely separate from the outlet bleed path 138.

Figure 7:
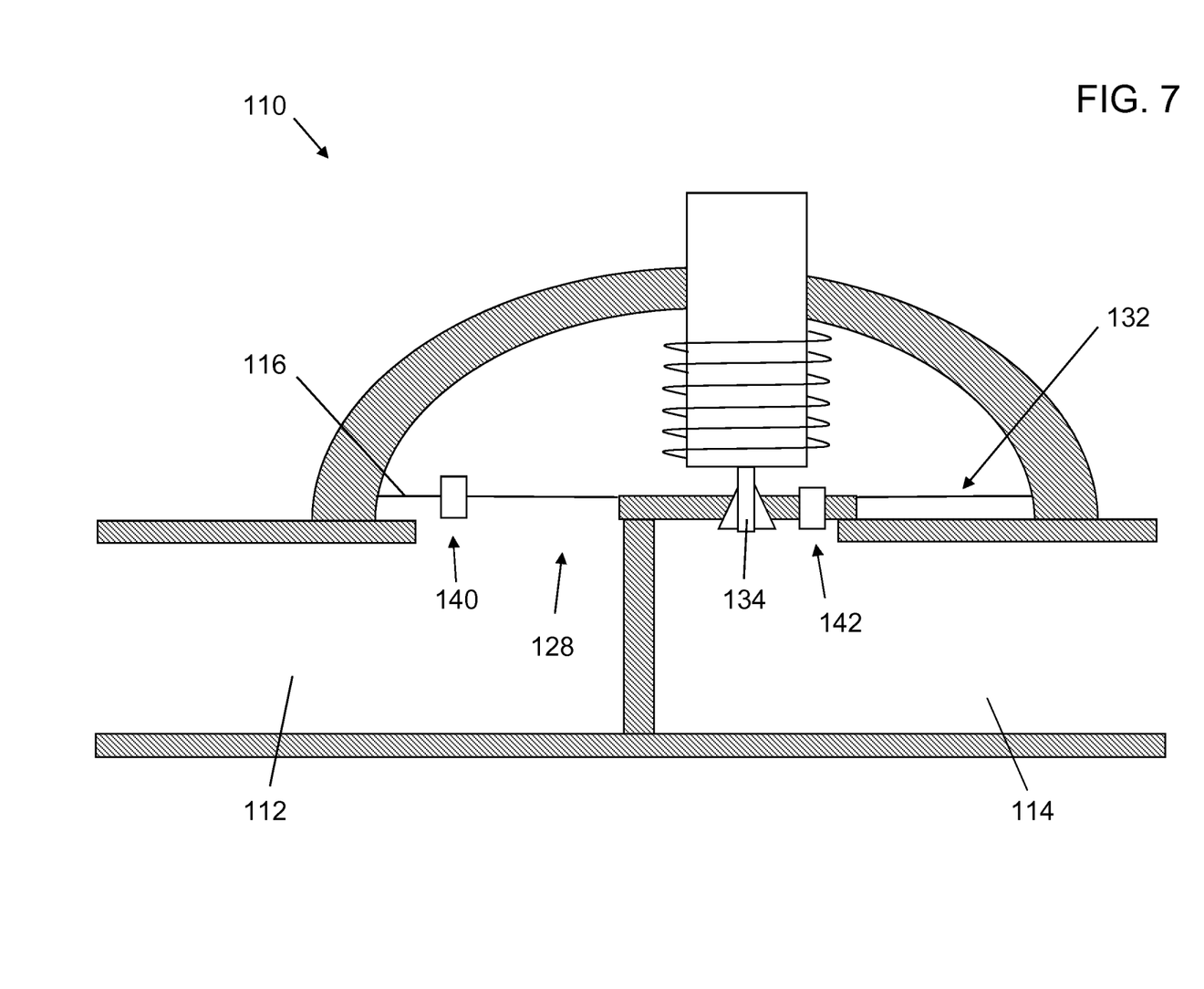
FIG. 7 illustrates a possible configuration of the valve of FIG. 5.

Referring also to FIG. 7, the inlet bleed path 130 may comprise a first check valve 140 mounted in the diaphragm 116 at the inlet 112. Similarly, the second bleed path 138 may comprise a second check valve 142 mounted in the diaphragm 116 at the outlet 114. These check valves, or other one way flow devices, 140,142 may be sized to be more restrictive than the pilot port 134, thereby also acting as the restriction 136. In any case, it can be seen that these check valves, or other one way flow devices, 140,142 allow flow from the first side 128, at the inlet port 112 or at the outlet port 114, to the second side 132 of the diaphragm 116 and prevent flow from the second side 132 to the first side 128 of the diaphragm 116.

Figure 8:
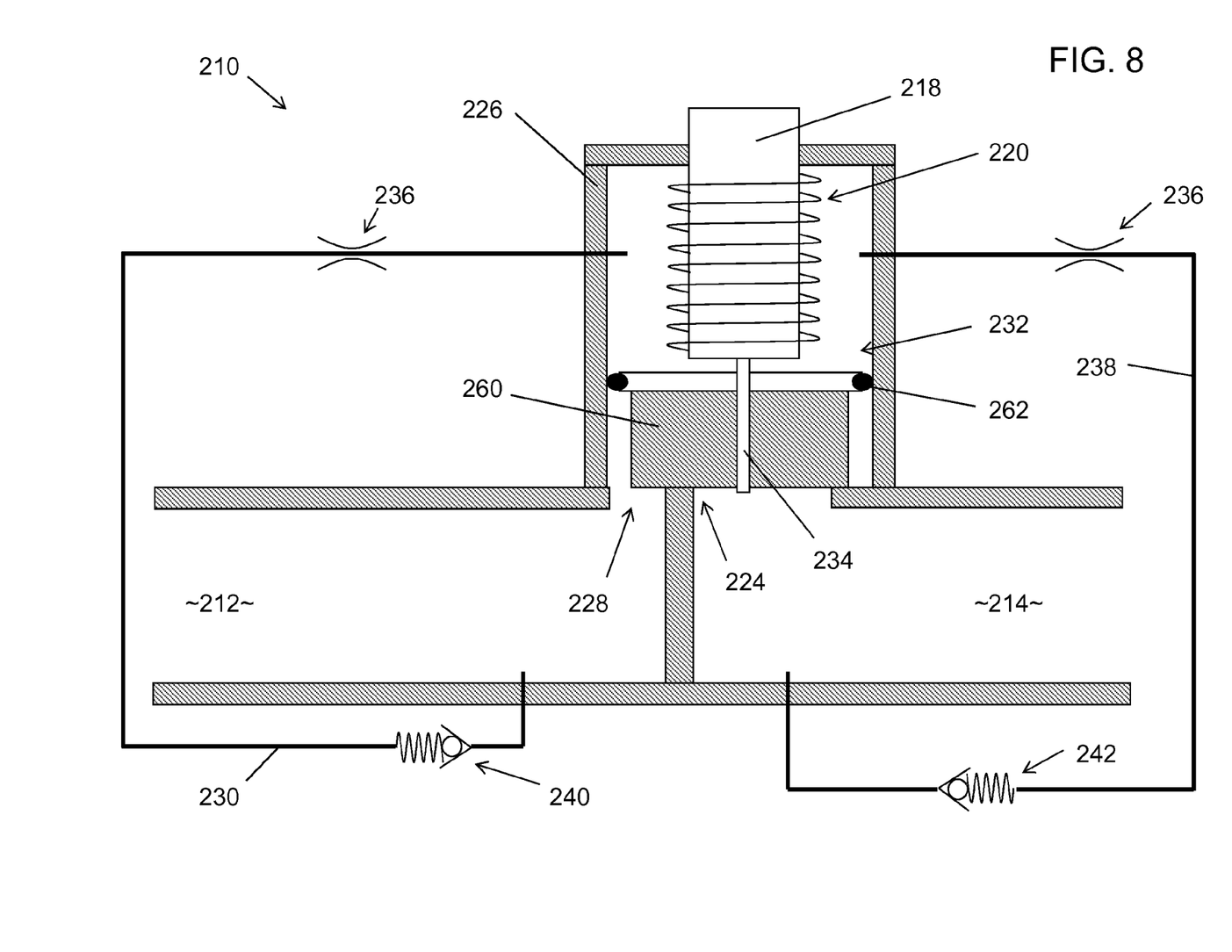
FIG. 8 illustrates a particular embodiment of a solenoid operated piloted piston valve utilizing certain aspects of the present inventions.

Alternatively, referring also to FIG. 8, rather than the diaphragm 116 mentioned above, the valve 110,210 may utilize some other differential pressure isolation member. In other words, the isolation member may be the diaphragm 116 mentioned above or may be some other isolation member, such as a piston 260.

Just as the solenoid operated piloted diaphragm valve 110 discussed above, a solenoid operated piloted piston valve 210, may be exposed to backpressure at an outlet port 214. If the backpressure, or outlet pressure, is higher than an inlet pressure at an inlet port 212, that backpressure may be able to force open the valve 210 and force communication between the inlet port 212 and the outlet port 214. More specifically, if the backpressure at the outlet port 214 is higher than the inlet pressure at the inlet port 212, the backpressure may push against a seal between a solenoid operated plunger 218 and a pilot port 234 in a piston 260, thereby overcoming a closing spring 220, lifting the plunger 218 off of the pilot port 234, and allowing communication between a first side 228 the piston 260, at the outlet port 214, and a second side 232 of the piston 260, opposing the ports 212, 214, and even the inlet port 212 through the bleed path 230. Additionally, or alternatively, if the backpressure at the outlet port 214 is greater than the inlet pressure at the inlet port 212, the backpressure may lift the piston 260 off a valve seat 224, thereby permitting direct communication between the outlet port 214 and the inlet port 212.

In this case, the solenoid operated piloted piston valve 210 also may include an outlet bleed path 238 from the outlet port 214 to the second side 232 of the piston 260. The outlet bleed path 238 preferably does not interfere with the function of the inlet bleed path 230, should one exist in any specific embodiment. Thus, the inlet bleed path 230 is still able to ensure that more surface area, of the second side 232, of the piston 260 is exposed to the inlet pressure, than is exposed to the first side 228 of the piston 260 at the inlet port 212. This difference in exposed surface area ensures that greater actual force is exerted against the second side 232 of the piston 260 than is asserted against the first side 228 of the piston 260, thereby holding the valve 210 closed. These parts may be at least partially enclosed by a body 226. The piston 260 may be sealed to body 226 with one or more O-ring seals 262.

To prevent the outlet bleed path 238 and the inlet bleed path 230 from interfering with the function of each other, and/or prevent cross contamination between the inlet port 212 and the outlet port 214, the inlet bleed path 230 may include an inlet check valve, or other one way flow device, 240 that allows flow from the first side 228, at the inlet port 212, to the second side 232 of the piston 260 and prevents flow from the second side 232 to the first side 228 of the piston 260. Alternatively, and/or additionally, the outlet bleed path 238 may include an outlet check valve, or other one way flow device, 242 that allows flow from the first side 228, at the outlet port 214, to the second side 232 of the piston 260 and prevents flow from the second side 232 to the first side 228 of the piston 260, at the outlet port 214.

As shown, the inlet bleed path 230 may be completely separate from the outlet bleed path 238. Alternatively, portions of the inlet bleed path 230 and the outlet bleed path 238 may be common.

Furthermore, the inlet bleed path 230 may comprise a first check valve 240 mounted in the piston 260 at the inlet 212. Similarly, the second bleed path 238 may comprise a second check valve 242 mounted in the piston 260 at the outlet 214. These check valves, or other one way flow devices, 240,242 may be sized to be more restrictive than the pilot port 234, thereby also acting as the restriction 236. In any case, it should be understood that these check valves, or other one way flow devices, 240,242 allow flow from the first side 228, at the inlet port 212 or at the outlet port 214, to the second side 232 of the piston 260 and prevent flow from the second side 232 to the first side 228 of the piston 260.

Other and further embodiments utilizing one or more aspects of the inventions described above can be devised without departing from the spirit of Applicant's invention. For example, the various methods and embodiments of the present invention can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A unidirectional flow valve assembly comprising:
an inlet port;
an outlet port;
a valve seat disposed fluidicly between the inlet port and the outlet port;
an isolation member configured to selectively allow fluid communication between the inlet port and the outlet port, the isolation member including
a diaphragm having a first side adjacent to both of the inlet and outlet ports, a second side opposed to both of the inlet and outlet ports;
a valve seal coupled to the first side of the diaphragm, the valve seal being configured to selectively couple with the valve seat to thereby selectively disallow fluid communication between the inlet and outlet ports; and
a pilot port disposed through the diaphragm and valve seal;
a first bleed path from the inlet port to the second side of the diaphragm and a second bleed path from the outlet port to the second side of the diaphragm;
a one way flow device in each of the first and second bleed paths, each one way flow device configured to allow fluid flow from the first side to the second side of the diaphragm and prevent fluid flow from the second side to the first side of the diaphragm; and
a spring loaded and solenoid operated plunger configured to selectively seal and unseal the pilot port to thereby selectively allow fluid communication from the second side of the diaphragm to the outlet port through the pilot port;
wherein the first bleed path and the second bleed path are configured so that fluid flow through the pilot port occurs only from the inlet port to the outlet port.

2. The assembly of claim 1, wherein the first bleed path comprises a first check valve mounted in the isolation member and the second bleed path comprises a second check valve mounted in the isolation member.

3. The assembly of claim 1, wherein a portion of the first bleed path is in common with a portion of the second bleed path.

4. The assembly of claim 1, wherein the diaphragm, the inlet port, the outlet port, the first bleed path, the second bleed path, the one way flow device in each of the first and second bleed paths, and the spring loaded and solenoid operated plunger are configured for gas flow only through the assembly.

5. The assembly of claim 1, further comprising:
a valve body that at least partially encloses the second side of the diaphragm; and
wherein a portion of the diaphragm having the pilot port disposed there through is configured to selectively move back and forth within the valve body.

6. The assembly of claim 5, further comprising wherein the portion of the diaphragm having the pilot port disposed there through is a central portion of the diaphragm.

7. The assembly of claim 1, further comprising wherein the valve seal and a portion of the diaphragm having the pilot port disposed there through are configured to move toward and away from the valve seat simultaneously.

8. The assembly of claim 1, further comprising:
a valve body that at least partially encloses the second side of the diaphragm; and
wherein the diaphragm is fixed to the valve body only at the diaphragm's periphery.

9. The assembly of claim 1, further comprising wherein the plunger extends at least partially through the pilot port disposed through the diaphragm and valve seal.

10. The assembly of claim 1, further comprising wherein the first bleed path and the second bleed path are more restrictive of fluid flow than the pilot port.

11. The assembly of claim 1, further comprising wherein the inlet port and the outlet port are parallel to one another.

12. The assembly of claim 1, further comprising a valve body that at least partially encloses the diaphragm and wherein a portion of the diaphragm having the pilot port disposed there through is moveable relative to the valve body.

13. A unidirectional flow valve assembly comprising:
a valve body having an inlet port and an outlet port;
a valve seat disposed fluidicly between the inlet port and the outlet port;
an isolation member disposed at least partially within the valve body and configured to selectively allow fluid communication between the inlet port and the outlet port through the valve seat, the isolation member including
a diaphragm having a first side adjacent to both of the inlet and outlet ports, a second side opposed to both of the inlet and outlet ports;
a valve seal coupled to the first side of the diaphragm, the valve seal being configured to selectively couple with the valve seat to thereby selectively disallow fluid communication between the inlet and outlet ports; and
a pilot port disposed through the diaphragm and valve seal;
a first bleed path from the inlet port to the second side of the diaphragm and a second bleed path from the outlet port to the second side of the diaphragm;
a one way flow device in at least one of the first and second bleed paths, the one way flow device being configured to allow fluid flow from the first side to the second side of the diaphragm and prevent fluid flow from the second side to the first side of the diaphragm; and
a spring loaded and solenoid operated plunger disposed at least partially within the pilot port and configured to selectively seal and unseal the pilot port to thereby selectively allow fluid communication from the second side of the diaphragm to the outlet port through the pilot port;
wherein the first bleed path and the second bleed path are more restrictive of fluid flow than the pilot port.

14. The assembly of claim 13, further comprising wherein the diaphragm is at least substantially flat.

15. The assembly of claim 13, further comprising wherein a portion of the diaphragm having the pilot port disposed there through is moveable relative to the valve body.

* * * * *